(12) United States Patent
Morita (10) Patent No.: US 10,597,060 B2
(45) Date of Patent: Mar. 24, 2020

(54) STEERING WHEEL AND METHOD OF MANUFACTURING SAME

(71) Applicant: TOYODA GOSEI CO., LTD., Kiyosu-shi, Aichi-ken (JP)

(72) Inventor: Bunpei Morita, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 491 days.

(21) Appl. No.: 15/442,757

(22) Filed: Feb. 27, 2017

(65) Prior Publication Data

US 2017/0282955 A1    Oct. 5, 2017

(30) Foreign Application Priority Data

Mar. 31, 2016    (JP) .................................. 2016-70440

(51) Int. Cl.
*B62D 1/06*    (2006.01)
*H05B 3/18*    (2006.01)
(Continued)

(52) U.S. Cl.
CPC .......... *B62D 1/065* (2013.01); *B29C 45/1459* (2013.01); *B29C 45/14819* (2013.01); *B29C 45/1657* (2013.01); *B29C 45/1671* (2013.01); *B29C 65/4855* (2013.01); *H05B 3/18* (2013.01); *B29C 2045/169* (2013.01); (Continued)

(58) Field of Classification Search
CPC ...... B29C 2045/1668; B29C 2045/169; B29C 45/1459; B29C 45/14819; B29C 45/1657; B29C 45/1671; B29C 65/4855; B29K 2675/00; B29K 2715/003;
(Continued)

(56) References Cited

U.S. PATENT DOCUMENTS 6,365,875 B1    4/2002 Kreuzer et al.
2003/0218004 A1    11/2003 Yoneyama et al.
(Continued)

FOREIGN PATENT DOCUMENTS

JP    S61-094869 A    5/1986
JP    2000-225952 A    8/2000
JP    2015-227067 A    12/2015

OTHER PUBLICATIONS

Office action dated May 9, 2019 issued in corresponding DE patent application No. 10 2017 104 449.3 (and English translation).
(Continued)

*Primary Examiner* — Dana Ross
*Assistant Examiner* — James F Sims, III
(74) *Attorney, Agent, or Firm* — Posz Law Group, PLC (57) ABSTRACT

A steering wheel is provided with a heater element on the rim. The heater element is mounted at least on a part of a core of the rim, and a cladding layer formed from synthetic resin foam covers an outer circumference of the heater element. The heater element includes a cord-shaped heater and a base material. The base material includes an insulation sheet that is formed from synthetic resin foam and disposed to face towards the core and a permeable sheet that is formed from non-metal which allows permeation of the cladding layer. The insulation sheet and permeable sheet are bonded together and sandwich and support the cord-shaped heater there between.

2 Claims, 8 Drawing Sheets

(51) Int. Cl.
    *B29C 45/14*     (2006.01)
    *B29C 65/48*     (2006.01)
    *B29C 45/16*     (2006.01)
    *B29K 675/00*     (2006.01)
    *B29L 9/00*     (2006.01)
    *B29L 31/30*     (2006.01)

(52) U.S. Cl.
    CPC .. *B29C 2045/1668* (2013.01); *B29K 2675/00* (2013.01); *B29K 2715/003* (2013.01); *B29K 2995/0015* (2013.01); *B29L 2009/005* (2013.01); *B29L 2031/3047* (2013.01)

(58) Field of Classification Search
    CPC ....... B29K 2995/0015; B29L 2009/005; B29L 2031/3047; B62D 1/065; H05B 3/18
    See application file for complete search history.

(56) References Cited

U.S. PATENT DOCUMENTS

2012/0118868 A1*   5/2012   Kim ...................... B62D 1/065
                                                                            219/204
2013/0062329 A1    3/2013   Morita
2015/0336602 A1   11/2015   Saito et al.
2015/0344061 A1   12/2015   Uematsu et al.
2016/0311457 A1   10/2016   Kato et al.

OTHER PUBLICATIONS

Office action dated Mar. 29, 2019 issued in corresponding JP patent application No. 2016-70440 (and English translation thereof).

* cited by examiner

STEERING WHEEL AND METHOD OF MANUFACTURING SAME

CROSS REFERENCE TO RELATED APPLICATIONS

The Present application claims priority from Japanese Patent Application No. 2016-070440 of Morita, filed on Mar. 31, 2016, the entire disclosure of which is incorporated herein by reference.

BACKGROUND OF THE INVENTION

1. Field of the Invention

The present invention relates to a steering wheel provided with a heater element on the rim and also relates to a method of manufacturing the same.

2. Description of Related Art

JP 2013-60149 A discloses a known steering wheel which has, on the rim, a heater element. The heater element includes a cord-shaped heater and a pair of base materials which support the cord-shaped heater. The base materials are composed of a heat insulation sheet disposed on a side of the heater facing towards a core of the rim and a heat transfer sheet disposed on a side of the heater facing towards a cladding layer of the rim. The heat transfer sheet covers an outwardly facing side of the heater. Specifically, an aluminum foil or the like is used as the heat transfer sheet.

With this configuration, when the heater element is actuated, in the area where the heater element is disposed, the heat insulation sheet prevents the heat generated by the cord-shaped heater from transferring to the core of the rim while the heat transfer sheet helps diffuse the heat quickly and thus raise the temperature of the area generally uniformly. However, when an only limited electric power is allowed in relation to other peripheral devices, the configuration of the above conventional art can be problematic because the heat diffusion caused by the heat transfer sheet may hinder a quick temperature elevation of the heater element.

SUMMARY OF THE INVENTION

An object of the present invention is to provide a steering wheel provided with a heater element by which a quick and sufficient temperature elevation can be obtained in the rim.

The steering wheel of the invention is provided with a heater element on the rim. The heater element is mounted at least on a part of a core of the rim, and a cladding layer formed from synthetic resin foam covers an outer circumference of the heater element. The heater element includes a cord-shaped heater and a base material which is composed of a sheet-shaped member having flexibility for supporting the cord-shaped heater.

The base material of the heater element includes an insulation sheet that is formed from synthetic resin foam and disposed to face towards the core and a permeable sheet that is formed from non-metal which allows permeation of the cladding layer. The insulation sheet and permeable sheet are bonded together and sandwich and support the cord-shaped heater there between.

In the steering wheel of the invention, the permeable sheet of the heater element, which covers the cord-shaped heater on the side facing towards the cladding layer, is formed from non-metal, and thus has a lower thermal conductivity than a heat transfer sheet used in a conventional steering wheel. Further, since it allows permeation of the cladding layer, the permeable sheet is capable of propagating the heat produced by the cord-shaped heater to the cladding layer without diffusing the heat quickly when the heater element is actuated. That is, when the heater element of the steering wheel is actuated, the heat produced by the cord-shaped heater is suppressed from transferring to the core due to the insulation sheet disposed between the heater and the core, but propagates to and heats a region of the permeable sheet in a vicinity of the cord-shaped heater. At this time, since the heat is suppressed from diffusing quickly in the permeable sheet, it can heat the region of the permeable sheet in the vicinity of the cord-shaped heater and a region of the cladding layer in a vicinity of the cord-shaped heater quickly and sufficiently. As a consequence, although it is difficult to raise the temperature of the whole permeable sheet in an even fashion in a precise sense and some unevenness in temperature can arise, the steering wheel of the invention will be able to heat the palms and fingers of a driver without making him feel a temperature difference and without spending great deal of electric power, if the arrangement (or intervals) of the cord-shaped heater is adequately tailored according to a distribution of temperature receptors in a human palm.

Therefore, the steering wheel of the invention will provide a quick and sufficient temperature elevation in the rim with the heater element.

Moreover, since the cord-shaped heater is sandwiched and supported between the insulation sheet and permeable sheet which are bonded together, the cord-shaped heater is adequately supported by the base material and will be prevented from slipping against the cladding layer or the core. Further, since the permeable sheet is infiltrated by the cladding layer, the permeable sheet, i.e., the heater element, will be prevented from slipping against the cladding layer.

More specifically, it is desired to compose the permeable sheet out of an open-cell foam which has a smaller density than the insulation sheet and the cladding layer.

It is also conceivable to form the permeable sheet out of a net-like sheet having flexibility.

The method of manufacturing a steering wheel of the invention is a method of manufacturing a steering wheel which is provided with a heater element on the rim. The heater element is mounted at least on a part of a core of the rim, and a cladding layer formed from synthetic resin foam covers an outer circumference of the heater element. The heater element includes a cord-shaped heater and a base material which is composed of a sheet-shaped member having flexibility.

The method includes:
providing an insulation sheet formed from synthetic resin foam;
providing a permeable sheet that is formed from non-metal which allows permeation of the cladding layer;
forming the heater element by bonding the insulation sheet and permeable sheet together with the cord-shaped heater disposed there between such that the base material composed of the insulation sheet and the permeable sheet sandwich and support the cord-shaped heater;
arranging the heater element around the core of the rim by adhering the insulation sheet to the core; and
forming the cladding layer around the heater element by injection molding.

With the method of manufacturing of the invention, when forming the cladding layer by injection molding, a forming material of the cladding layer infiltrates through the permeable sheet since the permeable sheet disposed to face towards the cladding layer allows permeation of the cladding layer. This method helps bind the heater element and the cladding layer strongly in comparison with a conventional method of manufacturing a steering wheel, such that the cladding layer will be prevented from slipping against the heater element when, by way of example, the rim is held by the driver. Moreover, with the method of manufacturing of the invention, since the heater element is secured to the core by adhering the base material to the core, the cladding layer and the heater element will be also prevented from slipping against the core.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
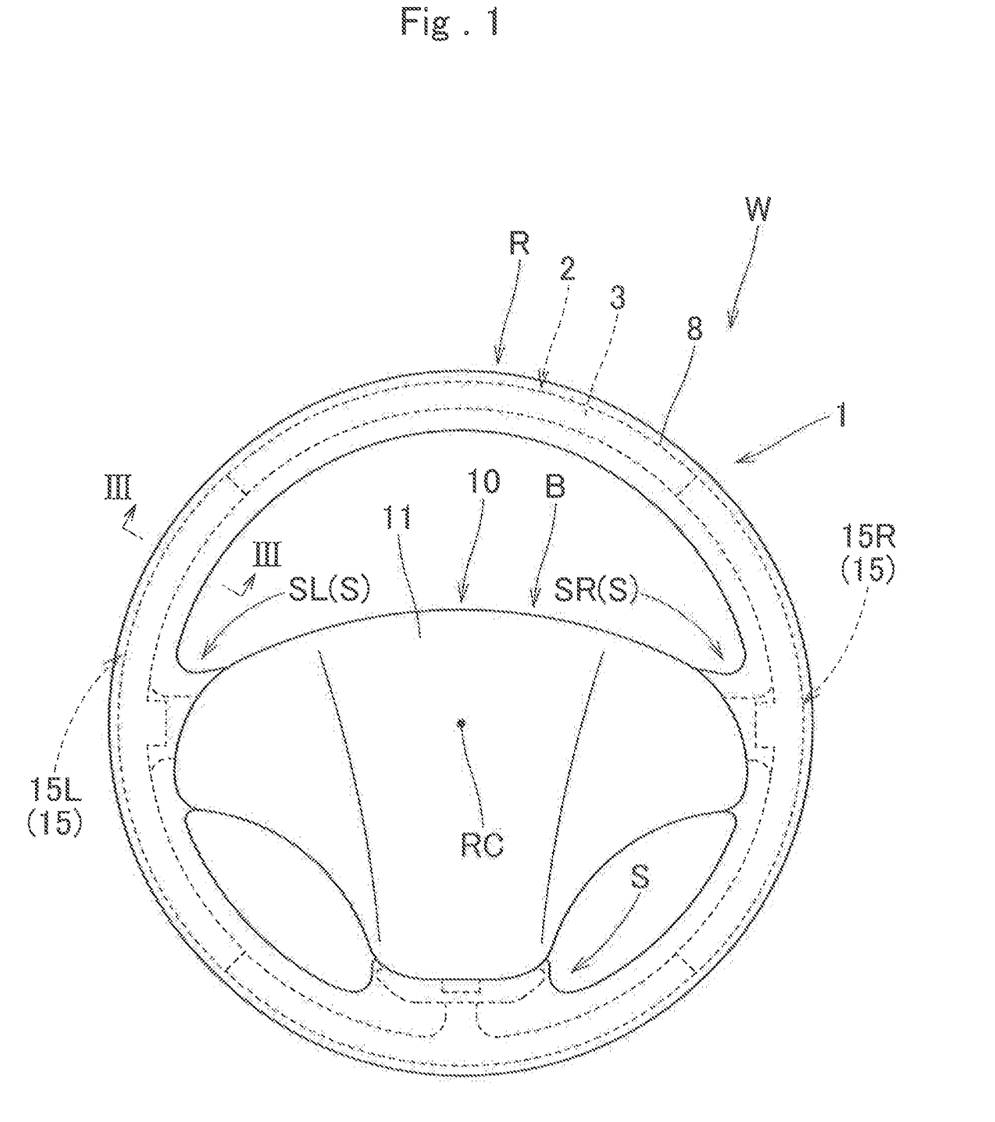
FIG. 1 is a plan view of a steering wheel embodying the invention.

As shown in FIG. 1, a steering wheel W embodying the invention includes a rim R, which is gripped with hands for steering, a boss section B disposed generally at the center of the rim R, and a plurality of (three, in this specific embodiment) spokes S interconnecting the rim R and the boss section B. In terms of components, the steering wheel W includes a wheel body 1, an airbag device 10 disposed on top of the boss section B, and a heater element 15 (15L and 15R) disposed on the rim R.

Unless otherwise specified, front and rear, up and down, and left and right directions in this description are intended to refer to the directions viewed from the steering wheel mounted on board and steered straight ahead. Therefore, the up and down direction refers to a direction extending along a central axis of rotation of the rim R, the front and rear direction refers to a direction perpendicular to the central axis of rotation of the rim R and extending generally along a front and rear direction of the vehicle, and the left and right direction refers to a direction perpendicular to the central axis of rotation of the rim R and extending generally along a left and right direction of the vehicle.

Figure 2:
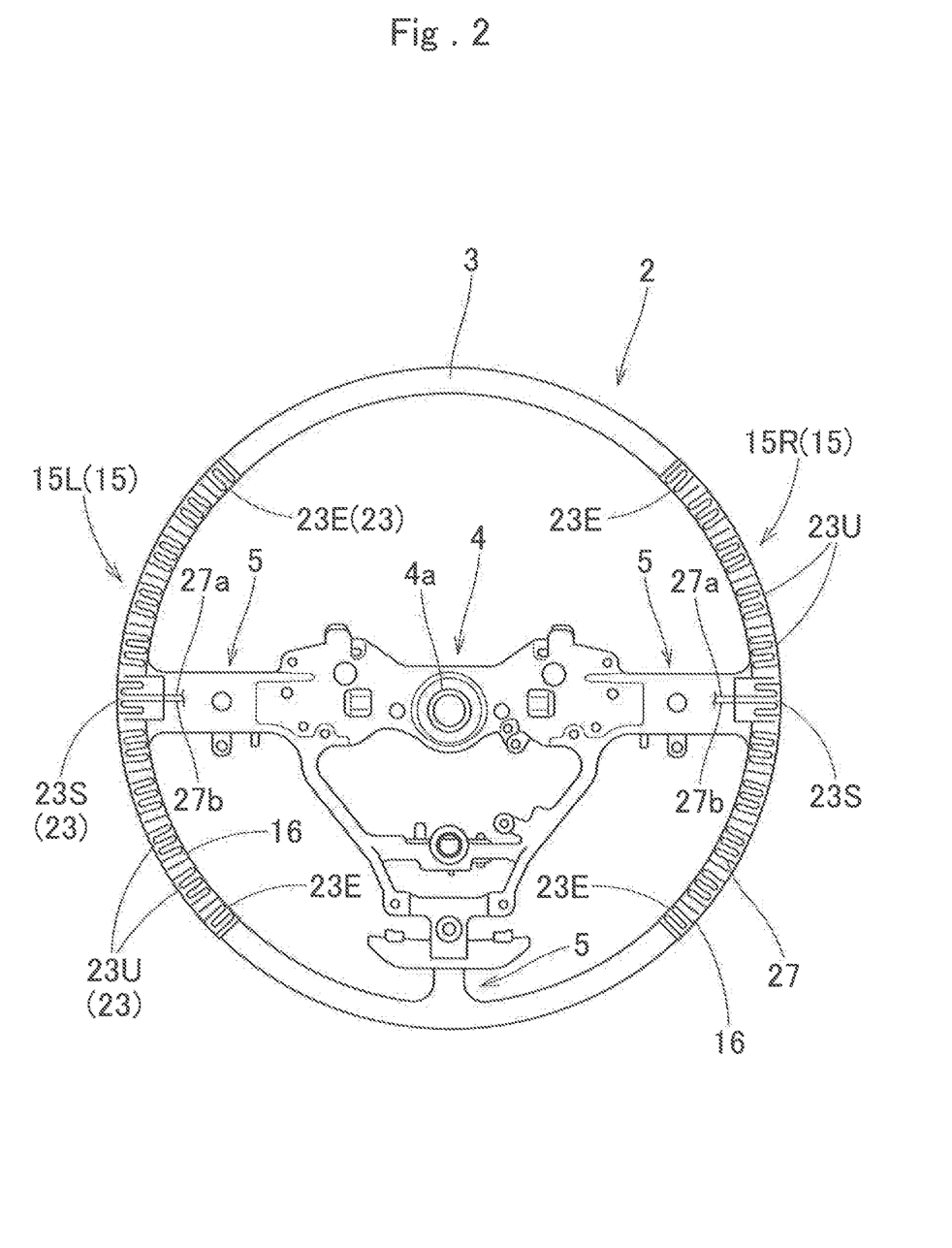
FIG. 2 depicts a core of the steering wheel of FIG. 1 on which heater elements are mounted.
Figure 3:
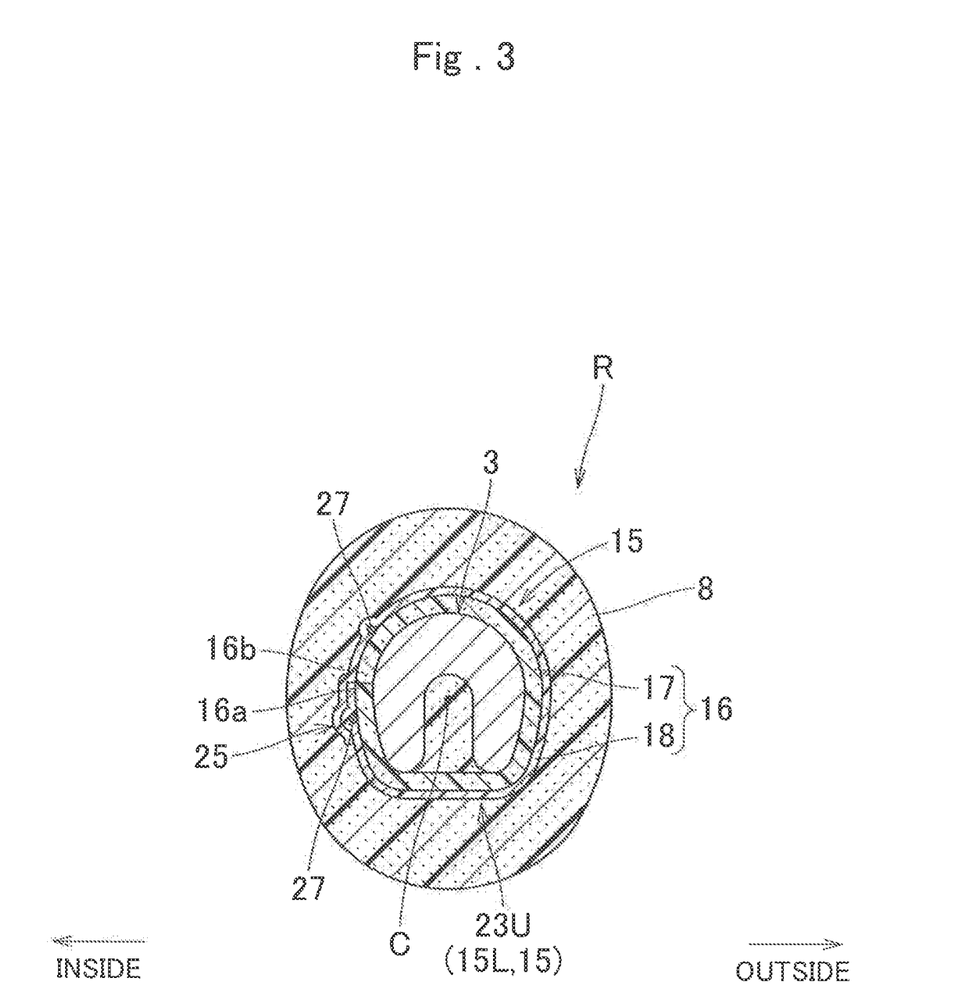
FIG. 3 is a partial enlarged sectional view taken along line III-III of FIG. 1.

As shown in FIGS. 1 to 3, the steering wheel body 1 includes a core 2 which has such a contour that the rim R, the boss section B and the spokes S are interconnected, a cladding layer 8 which covers the core 2 on the rim R and regions of the spokes S adjoining the rim R, and a not-shown lower cover which covers the underside of the boss section B.

As shown in FIG. 2, the core 2 includes a generally annular rim core 3 for forming the rim R, a boss core 4 for forming the boss section B at the center, and spoke cores 5 for forming the spokes S. A boss 4a serving as a joint to a not-shown steering shaft is disposed at the center of the boss core 4. The rim core 3 has a generally U-shaped sectional contour, as shown in FIG. 3. The core 2 is formed by die casting from such light alloy metal as aluminum, except the boss 4a made from steel.

The cladding layer 8 is formed from synthetic resin foam. In the illustrated embodiment, the cladding layer 8 is formed from polyurethane foam. More specifically, the cladding layer 8 is formed from a closed-cell-structured polyurethane foam with an apparent density within a range of 0.25 to 0.5 g/cm$^3$ (desirably, 0.3 to 0.4 g/cm$^3$, JIS K 7222), and a hardness of 50 (Shore A). In the rim R, the cladding layer 8 is configured to cover and coat the rim core 3 and the heater elements 15 mounted around the rim core 3, and has a generally oval sectional contour, as shown in FIG. 3. The cladding layer 8 does not have a uniform thickness. The thickness of the cladding layer 8 varies from region to region, but is no less than 3 mm at the thinnest region.

The airbag device 10, which is disposed on the boss section B, includes a not-shown airbag, which is folded up, a not-shown inflator for supplying the airbag with an inflation gas, and a pad 11 covering an upper side of the airbag. As shown in FIG. 1, the pad 11 covers an upper side of the boss section B and regions of the spokes S adjoining the boss section B all over.

Figure 4:
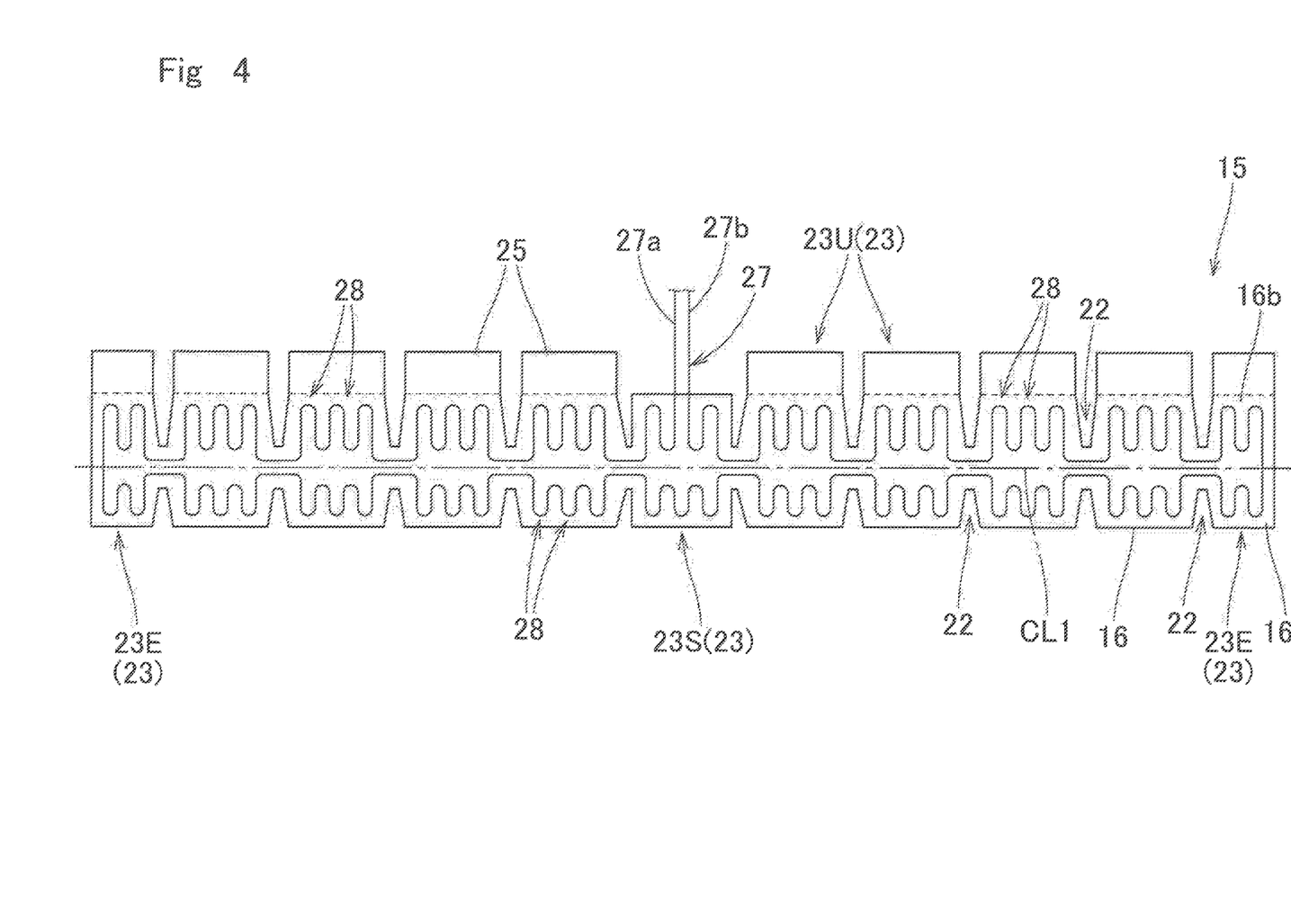
FIG. 4 is a plan view of the heater element laid flatly.
Figure 5:
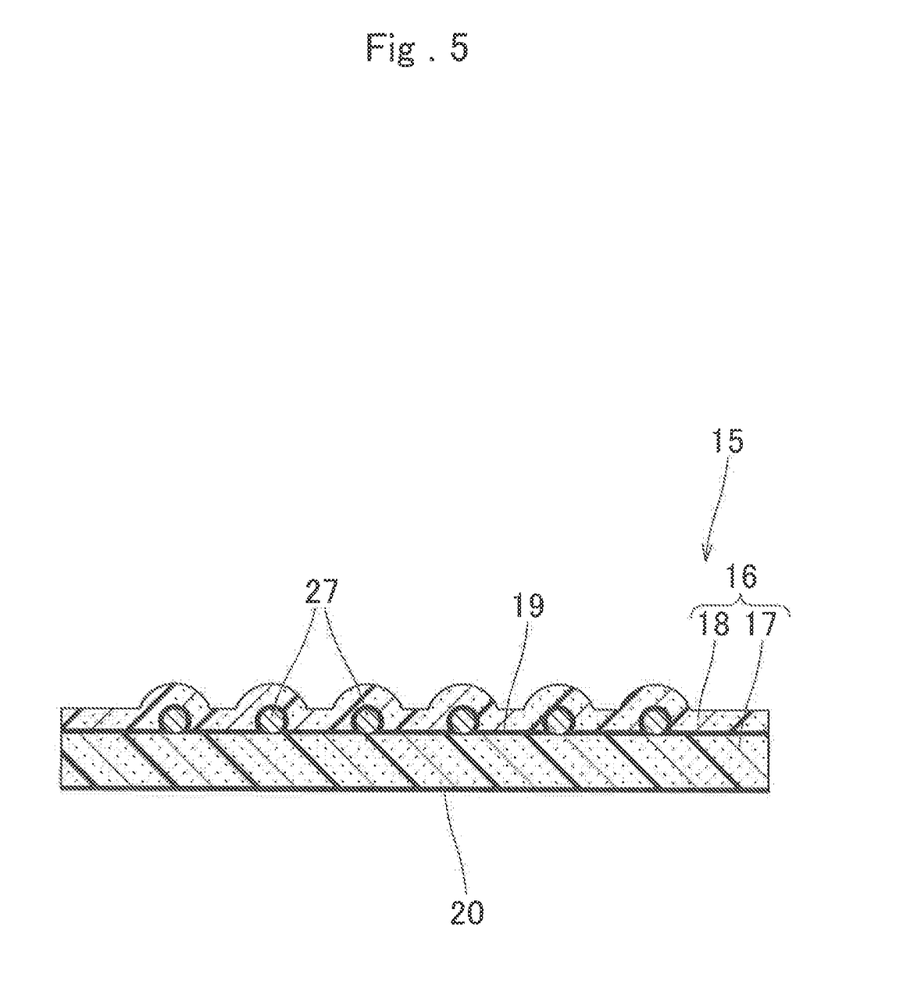
FIG. 5 is a partial enlarged sectional view of the heater element of FIG. 4.

As shown in FIGS. 1 and 2, the heater elements 15 (15L and 15R) of the illustrated embodiment are disposed on the regions of the rim R in a vicinity of the left spoke SL and in a vicinity of the right spoke SR, more particularly, on the regions of the rim R extending towards the front and rear from the left spoke SL and right spoke SR. The heater elements 15 are disposed to raise the temperatures of surficial regions of these regions. The heater elements 15 (15L and 15R) are mounted around the rim core 3 in a bilaterally symmetric fashion, and each includes a base material 16 fabricated of a sheet-shaped member having flexibility and a cord-shaped heater 27, as shown in FIGS. 4 and 5. The heater elements 15 (15L and 15R) are electrically connected to a not-shown control device which is disposed in a vicinity of the lower cover and has a power circuit, through the medium of a not-shown lead wire extending from the cord-shaped heater 27.

The base material 16 includes an insulation sheet 17 disposed to face towards the rim core 3 and a foam sheet (or a permeable sheet) 18 disposed to face towards the cladding layer 8. The insulation sheet 17 and foam sheet 18 are bonded together with the cord-shaped heater 27 sandwiched there between. That is, the base material 16 has a laminate structure of the insulation sheet 17 and foam sheet 18, and is formed by sandwiching the cord-shaped heater 27 with the insulation sheet 17 and foam sheet 18 and adhering the insulation sheet 17 and foam sheet 18 together with an adhesive layer (or a pressure-adhesive layer) 19. In the illustrated embodiment, the adhesive layer 19 is formed on the foam sheet 18, but it may alternatively be formed on the insulation sheet 17. Thus the base material 16 supports the cord-shaped heater 27. In the illustrated embodiment, both of the insulation sheet 17 and foam sheet 18 are fabricated from synthetic resin foam. That is, the foam sheet 18 serving as the permeable sheet is made from non-metal.

The insulation sheet 17 of the illustrated embodiment is fabricated from polyurethane foam, which is a material having the same physical properties as the cladding layer 8. More particularly, the insulation sheet 17 is formed from a closed-cell-structured polyurethane foam with an apparent density within a range of 0.2 to 0.6 g/cm$^3$ (desirably, 0.3 to 0.4 g/cm$^3$, JIS K 7222). The thickness of the insulation sheet 17 is about 2 to 4 mm (desirably, about 3 mm).

The foam sheet 18, which serves as the permeable sheet, is composed of an open-cell structure, and allows permeation or infiltration of the cladding layer 8. The foam sheet 18 has a smaller density than the insulation sheet 17 and than the cladding layer 8. The foam sheet 18 of the illustrated embodiment is fabricated of polyurethane foam. It is preferable that the density of the foam sheet 18 is about one tenth of that of the polyurethane foam forming the insulation sheet 17. Accordingly, the foam sheet 18 of the illustrated embodiment is fabricated of a polyurethane foam with an apparent density within a range of 0.01 to 0.06 g/cm$^3$ (desirably, about 0.06 g/cm$^3$, JIS K 7222). If an apparent density of the polyurethane foam forming the foam sheet 18 is less than 0.01 g/cm$^3$, the foam sheet 18 may possibly fail to hold the cord-shaped heater 27 in a fixing manner and may cause a slippage of the cord-shaped heater. On the other hand, an apparent density over 0.06 g/cm$^3$ would mean a so small expansion rate (or a so small amount of pores) that the foam sheet 18 will allow little permeation of the urethane material of the cladding layer 8 at molding of the cladding layer 8, resulting in a poor adhesion between the cladding layer 8 and foam sheet 18. The foam sheet 18 has a thickness of about 0.5 to 1.0 mm (desirably, about 1.0 mm). Since the foam sheet 18 is composed of an open-cell structure, the urethane material for forming the cladding layer 8 infiltrates into open pores of the foam sheet 18 when the cladding layer 8 is molded over the heater element 15 which has been wrapped around the rim core 3. Thus, after the cladding layer 8 has been formed, the constituent material of the cladding layer 8 infiltrates through a major region of the foam sheet 18, and the foam sheet 18 has generally equal physical properties to that of the cladding layer 8. That is, in the steering wheel W of the illustrated embodiment, the foam sheet 18 has a generally equal physical properties to those of the cladding layer 8 and insulation sheet 17.

In the base material 16 of the illustrated embodiment, an adhesive layer (or an pressure-adhesive layer) 20 is formed on the surface of the insulation sheet 17. The heater element 15 is wrapped around the rim core 3 by adhering the insulation sheet 17 to the rim core 3 with the aid of the adhesive layer 20. The adhesive (or pressure-adhesive) layers 19 and 20 formed on the base material 16 are each composed of a double-sided adhesive tape.

In the steering wheel W of the illustrated embodiment, each of the base materials 16 for forming the heater elements 15 is formed into an elongated contour extending generally along the central axis C (FIG. 3) of the rim core 3, as shown in FIG. 4. Specifically, each of the base materials 16 of the illustrated embodiment is so sized, in length and width, to cover about one fourth area of the rim R all over, as shown in FIG. 2. As shown in FIG. 3, each of the base materials 16 of the illustrated embodiment is so mounted around the rim core 3 that the central region in a width direction is disposed at an outer region of the rim core 3, which is remote from the rotational center RC (FIG. 1) of the rim R, while the edge regions 16a and 16b in the width direction abut against each other at an inner region of the rim core 3, which is close to the rotational center RC of the rim R.

In order to fit the annular rim core 3, the base material 16 of the illustrated embodiment is composed of a plurality of wrapping sections 23 which are split from one another on both of the edge regions 16a and 16b and are disposed along the length direction. More specifically, as shown in FIG. 4, the base material 16 is composed of eleven wrapping sections 23 which are jointed at a vicinity of the center in a width direction of the base material 16. Among them a spoke wrapping section 23S, which is located generally at the center in the length direction of the base material 16, covers the rim core 3 and a boundary area of the spoke core 5 with the rim core 3, as shown in FIG. 2. Other wrapping sections 23 except the spoke wrapping section 23S wrap the rim core 3, as shown in FIG. 2. Further, among the wrapping sections 23 a terminal wrapping section 23E, which is located at both of the terminals in the length direction of the base material 16, is smaller in width in the length direction of the base material 16 than normal wrapping sections 23U disposed between the spoke wrapping section 23S and terminal wrapping sections 23E (FIG. 4). As shown in FIG. 4, the edge regions 16a and 16b of the wrapping sections 23 (including the spoke wrapping section 23S, normal wrapping sections 23U and terminal wrapping sections 23E) are split up by cut-out regions 22 each of which is formed into a generally wedge-like shape narrowing towards the leading end. Each of the cut-out regions 22 is so shaped that the edge regions of the wrapping sections 23 may not overlap each other or form a great gap in between but cover the rim core 3 evenly without a gap when the base material 16 is mounted around the rim core 3 which has a curving annular contour.

The normal wrapping sections 23U and terminal wrapping sections 23E are each provided with a lap region 25 on the first edge region 16b, as shown in FIG. 4. Each of the lap regions 25 laps over the second edge region 16a when the base material 16 is mounted around the rim core 3. Each of the lap regions 25 is generally rectangular in outer contour. As shown in FIG. 3, when the base material 16 is mounted on the rim core 3, each of the lap regions 25 extends downward from the first edge region 16b and covers the outer circumference of the second edge region 16a.

As shown in FIG. 4, the cord-shaped heater 27 is disposed on the base material 16 in such a manner as to form a continuous pattern. In the illustrated embodiment, the cord-shaped heater 27 is arranged in an equally-spaced wavy pattern in both areas with respect to the center line CL1 (FIG. 4) of a circumferential direction of the rim core 3 (i.e., the center line CL1 of the width direction of the base material 16). The cord-shaped heater 27 arranged in the wavy pattern includes numerous curved protruding regions 28 each of which protrudes towards the edge region 16a or 16b in the area of the wrapping region 23. In the illustrated embodiment, all the curved protruding regions 28 have a generally equal protruding amount towards the edge region 16a or 16b. The cord-shaped heater 27 of the illustrated embodiment has a wire diameter of 0.7 mm. The cord-shaped heater 27 is arranged in an equally-spaced fashion such that a distance in between is generally equal. In the illustrated embodiment, the cord-shaped heater 27 is arranged at an interval of within a range of 3 to 13 mm. The interval over 15 mm would not be preferable because it can let the driver feel an unevenness in temperature. More specifically, in the illustrated embodiment, each of the spoke wrapping section 23S and the normal wrapping sections 23U has three each curved protruding regions 28 on both sides of the center line CL1, i.e., total six curved protruding regions 28. Each of the terminal wrapping sections 23E has two each curved protruding regions 28 on both sides of the center line CL1, i.e., total four curved protruding regions 28. Further, in the illustrated embodiment, the terminals 27a and 27b of the cord-shaped heater 27 lead out of the center of a region of the spoke wrapping section 23S covering an upper area of the spoke core 5 in a vicinity of the rim R, as shown in FIGS. 2 and 4. Through the medium of not-shown lead wires, the terminals 27a and 27b are connected with the not-shown control device.

Figure 7:
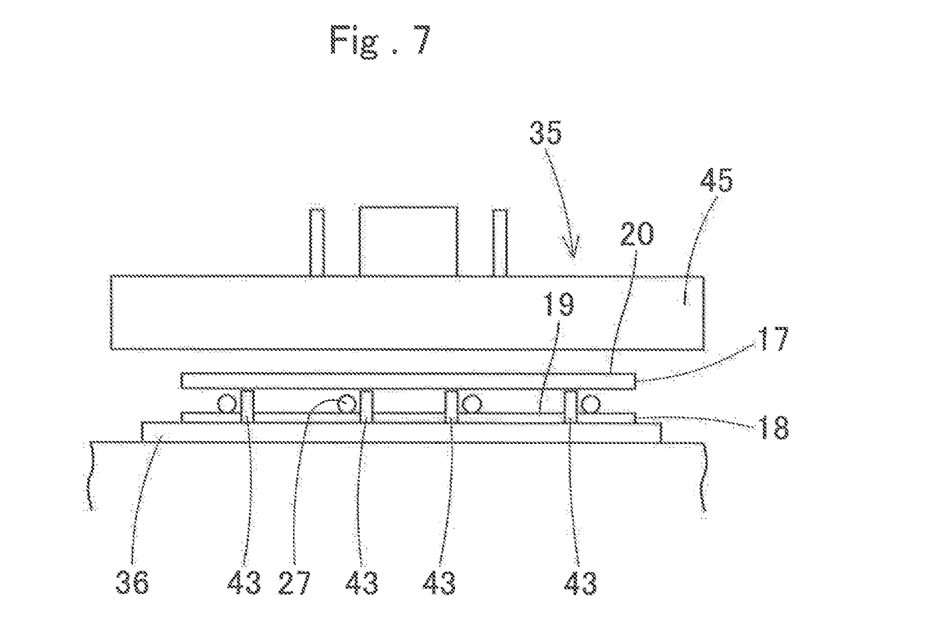
FIG. 7 schematically illustrates a production process of the heater element with the aid of a heater manufacturing device.

Manufacturing of the steering wheel W is now described. Firstly, the heater elements 15 (15L and 15R) are produced. The heater elements 15 can be produced using a hot-press heater manufacturing device 35 as depicted in FIG. 7. The manufacturing device 35 includes a bottom platen 36 with a plurality of hook mechanisms 40 and a heat platen 45 which is disposed above the hook mechanisms (heater arranging device) 40 and reciprocably movable in an up and down direction.

Figure 6:
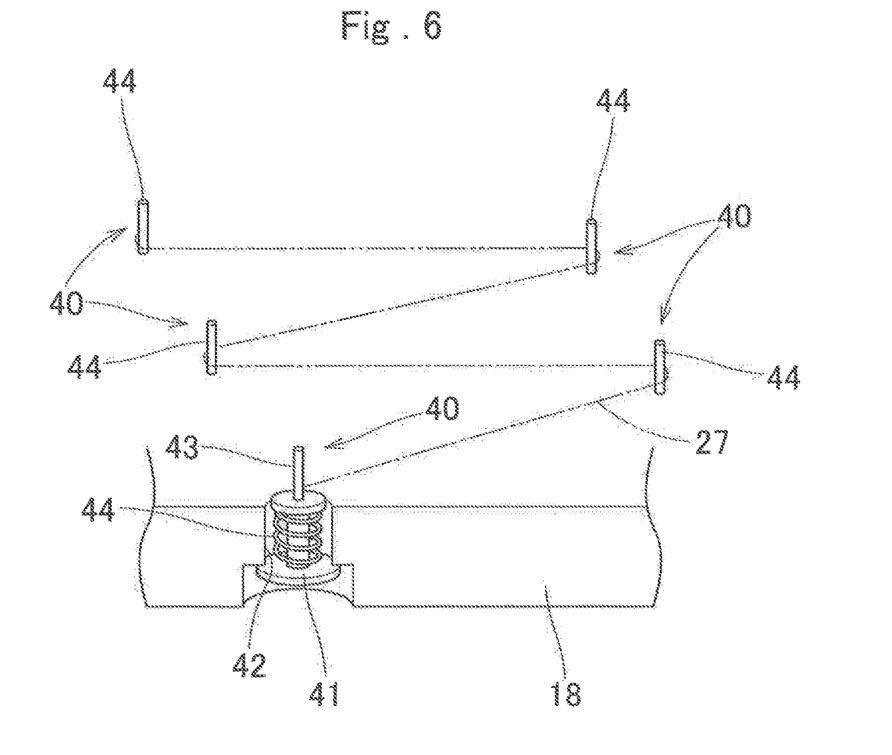
FIG. 6 is a schematic perspective view showing the way a cord-shaped heater of the heater element is arranged in a predetermined pattern with the aid of a heater arranging device.

As shown in FIG. 6, each of the hook mechanisms 40 includes a pin section 41 which is inserted into a hole 42 bored in the bottom platen 36 from below. The pin section 41 is provided, at the top, with a hook member 43 which is formed into a post and protrudes upward out of the hole 42. The hook member 43 is movable in the axial direction and is constantly biased upwardly by a coil spring 44.

In the manufacturing process of the illustrated embodiment, the foam sheet 18 is firstly laid on the bottom platen 36 with the adhesive layer 19 facing up such that the hook members 43 penetrate the foam sheet 18. Then the cord-shaped heater 27 is wound around the hook members 43 of the hook mechanisms 40 one after another to form a predetermined pattern on the foam sheet 18. Then the insulation sheet 17, which has the adhesive layer 20 on the surface facing away from the foam sheet 18 (i.e., on the upper surface), is laid over the foam sheet 18 and cord-shaped heater 27. The adhesive layer 20 formed on the insulation sheet 17 is covered with a not-shown release sheet. Then the heat platen 45 is moved downward towards the bottom platen 36 such that heat and pressure are applied to the insulation sheet 17 and foam sheet 18. Thus the insulation sheet 17 and foam sheet 18 are bonded together with the aid of the adhesive layer 19, the base material 16 is formed, and the cord-shaped heater 27 is sandwiched and supported by the insulation sheet 17 and foam sheet 18. When the heat platen 45 is moved downward to apply heat and pressure to the insulation sheet 17 and foam sheet 18, the hook members 43 of the hook mechanisms 40 move downward against the biasing force of the coil springs 44. Then, if the base material 16 (i.e., the insulation sheet 17 and foam sheet 18) is cut in a predetermined shape with a cutter or the like, the heater element 15 is completed.

Figure 8A:
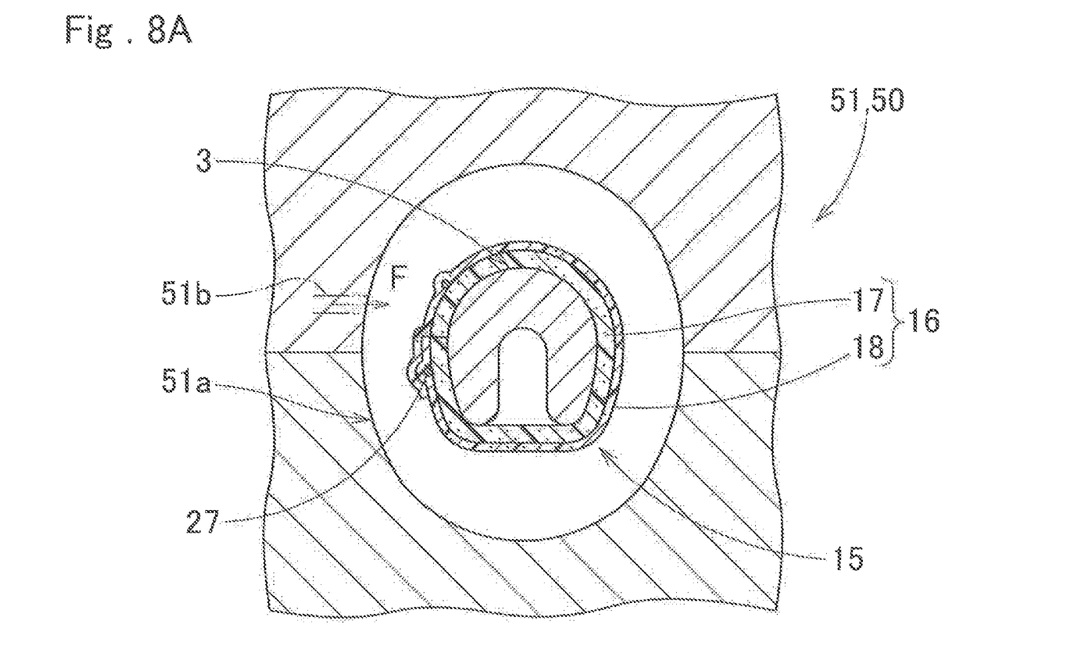
FIGS. 8A and 8B illustrate the way a cladding layer of the steering wheel is formed.
Figure 8B:
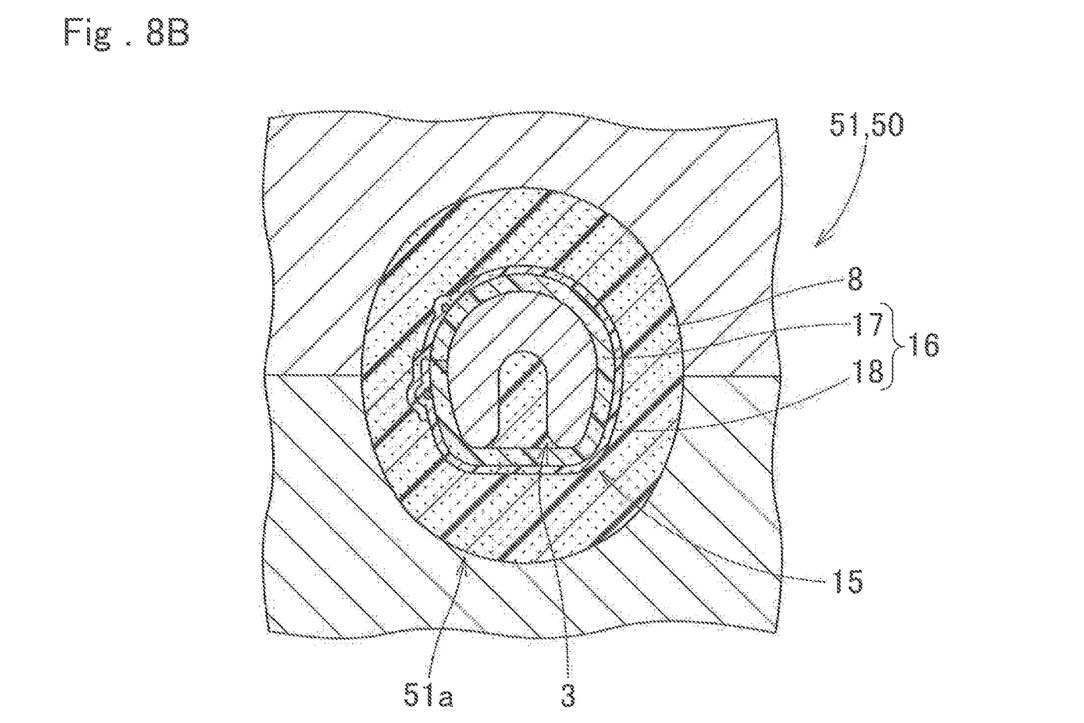

Thereafter, the base material 16 of each of the heater elements 15 formed as described above is adhered to and wound around the rim core 3 and the region of the spoke core 5 in the vicinity of the rim core 3 with the aid of the adhesive layer 20 formed on the insulation sheet 17. Then the core 2, on which the heater elements 15 are mounted, is set on an injection molding machine 50 as shown in FIG. 8A, the mold 51 is closed, and a molding material F for forming the cladding layer 8 is injected into a cavity 51a via a gate 51b. If then the molding material F forms foam and becomes solidified and the mold 51 is opened, the cladding layer 8 is formed. Subsequently, the not-shown lower cover is mounted on the core 2 to complete the steering wheel body 1, and the lead wires leading from the cord-shaped heaters 27 of the heater elements 15L and 15R are connected to the control device. Then the airbag device 10 is mounted on the steering wheel body 1. Thus the steering wheel W is completed.

In the steering wheel W of the illustrated embodiment, the foam sheet (i.e., permeable sheet) 18 of the heater element 15, which covers the cord-shaped heater 27 on the side facing towards the cladding layer 8, is formed from an open-cell synthetic resin foam, i.e., non-metal, which allows permeation or infiltration of the cladding layer 8. The foam sheet 18 made from non-metal, from synthetic resin foam especially in the illustrated embodiment, has a lower thermal conductivity than a heat transfer sheet used in a conventional steering wheel. Further, also because the foam sheet 18 allows permeation of the cladding layer 8, the foam sheet 18 is capable of propagating the heat produced by the cord-shaped heater 27 to the cladding layer 8 without diffusing the heat quickly when the heater element 15 is actuated. That is, when the heater element 15 of the steering wheel W is actuated, the heat produced by the cord-shaped heater 27 is suppressed from transferring to the rim core 3 due to the insulation sheet 17 disposed between the heater 27 and the rim core 3, but propagates to and heats a region of the foam sheet 18 in a vicinity of the cord-shaped heater 27. At this time, since the heat is suppressed from diffusing quickly in the foam sheet 18, it can heat the region of the foam sheet 18 in the vicinity of the cord-shaped heater 27 and a region of the cladding layer 8 in a vicinity of the cord-shaped heater 27 quickly and sufficiently. As a consequence, although it is difficult to raise the temperature of the whole foam sheet 18 in an even fashion in a precise sense and some unevenness in temperature can arise, the steering wheel W of the embodiment will be able to heat the palms and fingers of a driver without making him feel a temperature difference and without spending great deal of electric power if the arrangement (or intervals) of the cord-shaped heater 27 is adequately tailored according to a distribution of temperature receptors in a human palm. More particularly, the steering wheel W of the illustrated embodiment is capable of heating a peripheral area of the cord-shaped heater 27 to a certain temperature in about half the time it would take a steering wheel provided with a conventional heat transfer sheet.

Therefore, the steering wheel W will provide a quick and sufficient temperature elevation in the rim R with the heater elements 15.

In the steering wheel W of the illustrated embodiment, the cladding layer 8 is formed by injection molding after the heater element 15 is arranged around the rim core 3 by adhering the insulation sheet 17 to the core 3. Further, the foam sheet or permeable sheet 18, which constitutes the base material 16 of the heater element 15 and is disposed to face towards the cladding layer 8, allows permeation of the cladding layer 8. With this configuration, when the cladding layer 8 is formed by injection molding, the material of the cladding layer 8 infiltrates through the foam sheet 18 via the open cells of the foam sheet 18. Therefore, the heater element 15 and the cladding layer 8 are bound strongly in comparison with a steering wheel with a conventional heat transfer sheet, such that the cladding layer 8 will be prevented from slipping against the heater element 15 when, by way of example, the rim R is gripped by the driver. Moreover, since the heater element 15 of the steering wheel W is secured to the core 2 by adhering the base material 16 to the core 2, the cladding layer 8 and the heater element 15 will be also prevented from slipping against the core 2.

In the steering wheel W of the illustrated embodiment, furthermore, the foam sheet (or permeable sheet) 18 is composed of an open-cell foam which has a smaller density (i.e., apparent density) than the insulation sheet 17 and than the cladding layer 8. Particularly, the density of the foam sheet 18 of the illustrated embodiment is about one tenth of that of the polyurethane foam forming the insulation sheet 17. Accordingly, a major region of the foam sheet 18 is infiltrated by the constituent material of the cladding layer 8, and thus the foam sheet 18 has generally the same physical properties as the cladding layer 8. In the illustrated embodiment, however, since the cord-shaped heater 27 is not merely disposed on the insulation sheet but is sandwiched between the insulation sheet 17 and foam sheet 18 which are bonded together, the cord-shaped heater 27 is adequately supported by the base material 16 and is prevented from slipping against the cladding layer 8 or rim core 3.

Although, in the foregoing embodiment, both of the insulation sheet 17 and foam sheet 18 forming the base material 16 of the heater element 15 are polyurethane foam, materials of the insulation sheet and foam sheet should not be limited thereby. By way of example, the insulation sheet and the foam sheet may also be formed from polyethylene foam or the like.

Figure 9:
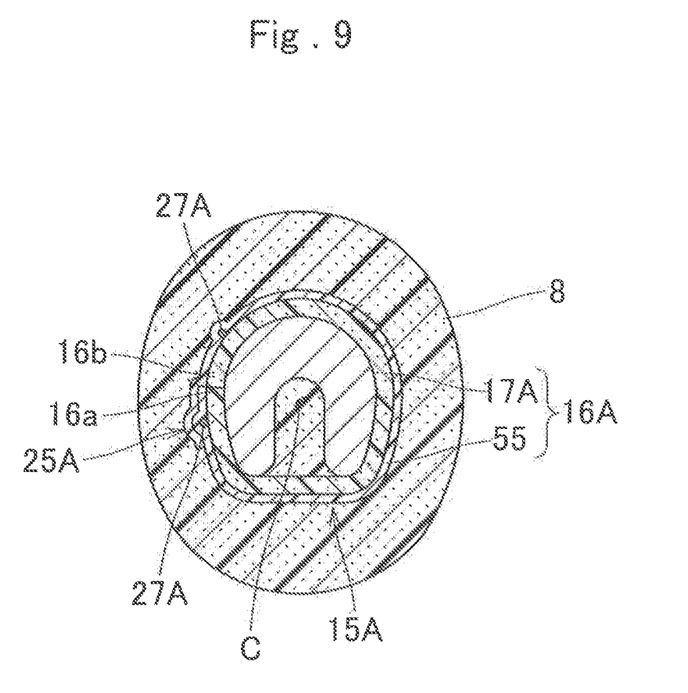
FIG. 9 is a partial enlarged sectional view of a steering wheel of an alternative embodiment of the invention.

FIG. 9 depicts a heater element 15A according to an alternative embodiment. The permeable sheet of the heater element 15A is composed of a net-like sheet 55 having flexibility. The heater element 15A has the same configuration as the heater element 15 of the steering wheel W of the foregoing embodiment except in the net-like sheet 55, and therefore, detailed descriptions of common members will be omitted, and the common members will be assigned "A" at the end of common reference numerals.

Figure 10:
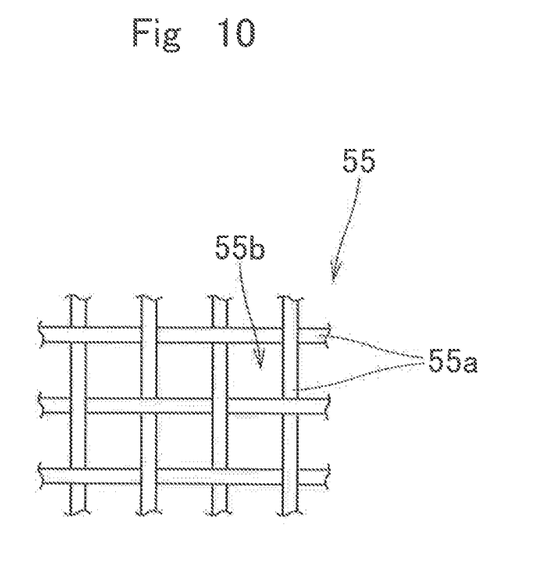
FIG. 10 depicts a net-like sheet used in the steering wheel of FIG. 9.

The net-like sheet 55 serving as the permeable sheet is formed from non-metal, and as shown in FIG. 10, formed by weaving original yarns 55a, each of which is composed of a synthetic resin monofilament, into a mesh configuration. Specifically, the original yarn 55a is formed from nylon 6,6 and has a 0.22 mm diameter. The net-like sheet 55 of this specific embodiment is formed by weaving such original yarns 55a at intervals of 1.4 mm into a mesh configuration with a 0.33 mm thickness. In this net-like sheet 55, the cladding layer 8 infiltrates into the gaps 55b formed between the original yarns 55a. Also in the heater element 15A, the net-like sheet 55 and the insulation sheet 17A are bonded together with a not-shown adhesive layer (or a pressure-adhesive layer) disposed there between, and a cord-shaped heater 27A is sandwiched between the net-like sheet 55 and the insulation sheet 17A.

In the steering wheel in which the net-like sheet 55 is employed as the permeable sheet, since the net-like sheet 55 is formed from non-metal and configured to allow permeation or infiltration of the cladding layer 8, the heat produced by the cord-shaped heater 27A propagates to the cladding layer 8 without diffusing quickly, and a region of the net-like sheet 55 in a vicinity of the cord-shaped heater 27A and a region of the cladding layer 8 in a vicinity of the cord-shaped heater 27A are heated quickly and sufficiently, when the heater element 15A is actuated. Moreover, when the cladding layer 8 is formed by injection molding, the material of the cladding layer 8 infiltrates into the gaps 55b between the original yarns 55a, such that the heater element 15A and the cladding layer 8 are bound together strongly. Therefore, also with the configuration employing the net-like sheet 55, the cladding layer 8 will be prevented from slipping against the heater element 15A when, by way of example, the rim R is gripped by the driver. Further, since the cord-shaped heater 27A is sandwiched between the insulation sheet 17 and net-like sheet 55 which are bonded together, the cord-shaped heater 27A is adequately supported by the base material 16A and will be prevented from slipping against the cladding layer 8 or rim core 3.

In the foregoing embodiments, the foam sheet 18 and the net-like sheet 55 serving as the permeable sheet are both formed from synthetic resin. However, the material of the permeable sheet should not be limited to synthetic resin. The permeable sheet may also be formed from such material as synthetic fiber, natural fiber, paper, leather or the like, which is non-metal having less thermal conductivity than a metal like an aluminum foil and allows permeation of the cladding layer.

In the steering wheel W of the foregoing embodiment, the heater elements 15L and 15R are disposed only on the region in a vicinity of the left spoke SL and the region in a vicinity of the right spoke SR in the rim R. However, the range in the rim R where the heater element is disposed should not be limited thereby, but the heater element may be mounted on a generally entirety of the rim R.

What is claimed is:

1. A steering wheel comprising:
a rim to be handheld for steering;
a heater element that is mounted at least on a part of a core of the rim and includes a cord-shaped heater and a base material which is composed of a sheet-shaped member having flexibility for supporting the cord-shaped heater; and
a cladding layer that is formed from synthetic resin foam for covering an outer circumference of the heater element, wherein
the base material of the heater element includes an insulation sheet that is formed from synthetic resin foam and disposed to face towards the core and a permeable sheet that is formed from non-metal and that is permeated with the cladding layer,
the permeable sheet is composed of an open-cell foam that has a smaller density than the insulation sheet and the cladding layer, and
the insulation sheet and the permeable sheet are bonded together and sandwich and support the cord-shaped heater therebetween.

2. A method of manufacturing a steering wheel comprising a rim to be handheld for steering; a heater element that is mounted at least on a part of a core of the rim and includes a cord-shaped heater and a base material that is composed of a sheet-shaped member having flexibility for supporting the cord-shaped heater; and a cladding layer that is formed from synthetic resin foam for covering an outer circumference of the heater element,
the method comprising:
providing an insulation sheet formed from synthetic resin foam;
preparing a permeable sheet from an open-cell foam that has a smaller density than the insulation sheet and the cladding layer, the permeable sheet is formed from non-metal and allows permeation of the cladding layer;
forming the heater element by bonding the insulation sheet and permeable sheet together with the cord-shaped heater disposed there between such that the base material composed of the insulation sheet and the permeable sheet sandwich and support the cord-shaped heater;

arranging the heater element around the core of the rim by adhering the insulation sheet to the core; and forming the cladding layer around the heater element by injection molding such that the cladding layer permeates the permeable sheet.

* * * * *